Oct. 11, 1966 N. L. COX 3,278,263
FERROMAGNETIC CHROMIUM DIOXIDE AND PREPARATION THEREOF
Filed Nov. 27, 1964
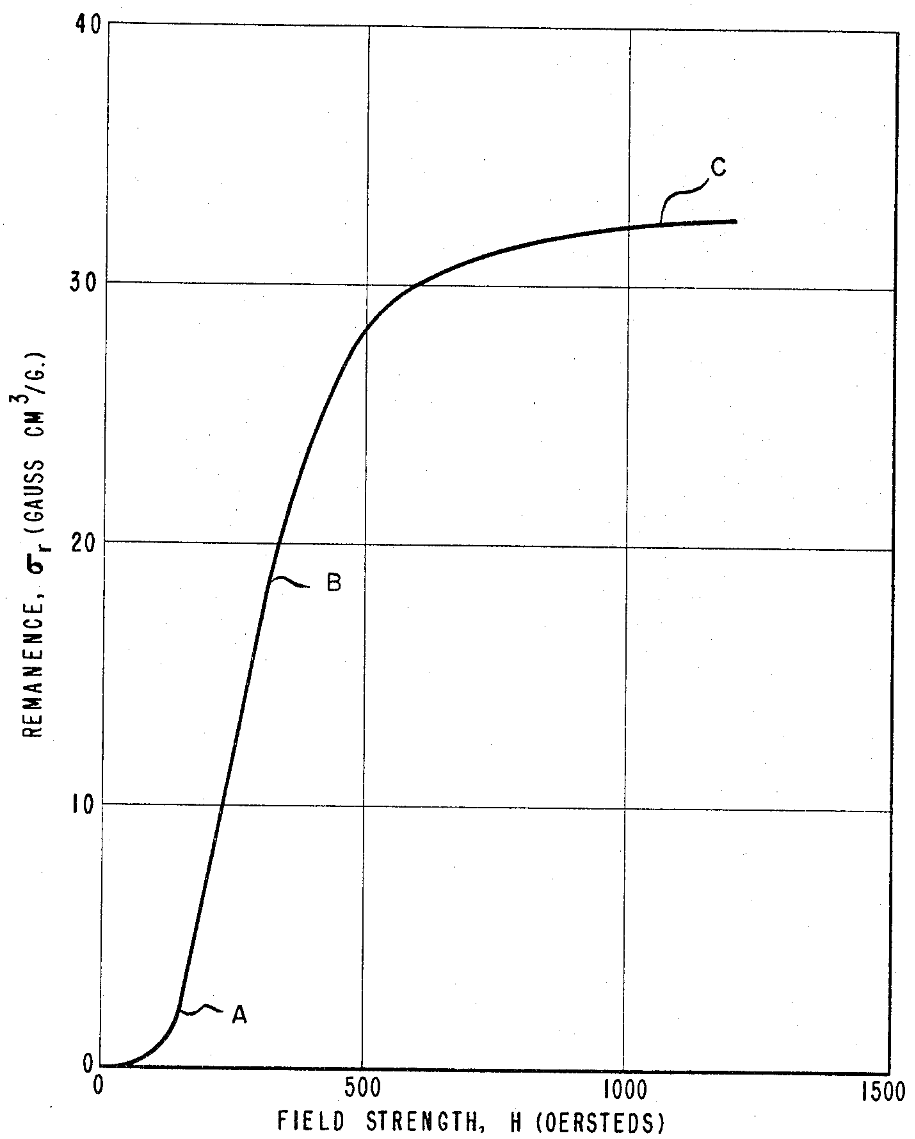
INVENTOR
NORMAN L. COX
BY James H. Ryan
ATTORNEY United States Patent Office 3,278,263
Patented Oct. 11, 1966

3,278,263
FERROMAGNETIC CHROMIUM DIOXIDE AND PREPARATION THEREOF

Norman L. Cox, Claymont, Del., assignor to E. I. du Pont de Nemours and Company, Wilmington, Del., a corporation of Delaware
Filed Nov. 27, 1964, Ser. No. 414,058
10 Claims. (Cl. 23—145)

This application is a continuation-in-part of my copending application Serial No. 238,292, filed November 16, 1962, and now abandoned, which was a continuation-in-part of my application Serial No. 42,758, filed July 14, 1960, and also now abandoned.

This invention relates to, and has as its principal objects provision of, a novel process for preparing ferromagnetic chromium dioxide, novel ferromagnetic chromium dioxide of high coercive force produced by the process, and magnetic recording members having the novel chromium dioxide as the magnetic component.

Ferromagnetic materials are employed in a variety of applications, some of which require material having a high coercive force and others employ material having a low coercive force. Recently, processes which employ hexavalent chromium compounds, such as chromium trioxide and chromyl chloride, as starting materials, have been described for preparing ferromagnetic chromium oxide of a quality suitable for use in such applications. Although low coercive force material can be prepared directly, these prior processes require the presence of modifying agents, such as antimony trioxide, for the preparation of high coercive force ferromagnetic chromium oxide.

The present invention provides a process for producing high-quality ferromagnetic compositions, consisting essentially of ferromagnetic chromium dioxide suitable for various applications from trivalent chromium compounds. This process is the oxidation at elevated pressure and temperature of a chromium(III) compound or a thermal conversion product thereof.

Although according to this invention, compounds of chromium(III) combined with oxygen may be converted directly to ferromagnetic chromium dioxide, the conversion can also be carried out in two stages. The two-stage process is a preferred embodiment of the invention, since by suitable choice of conditions during each stage, as described below, ferromagnetic chromium dioxide of high coercive force, i.e., dioxide having an intrinsic coercive force of at least 200 oersteds, can be prepared readily without the necessity of introducing foreign elements into the crystal lattice. By virtue of not having a modifier present, the ferromagnetic chromium dioxide of high coercive force possesses a higher saturation induction per gram or sigma value, $\sigma_s$, than products of an equivalent intrinsic coercive force prepared by earlier methods requiring the presence of such modifiers. Because of improved homogeneity and excellent magnetic properties, the new product is particularly useful in the preparation of magnetic recording members. Such high-purity, unmodified, ferromagnetic chromium dioxide of high coercive force constitutes a part of the present invention.

As starting material in carrying out the process of this invention, compounds of chromium(III) combined with oxygen, such as chromium (III) oxide or a hydrated form thereof, are preferred since such materials are readily available and easily converted to high quality ferromagnetic chromium oxide. However, other compounds of chromium(III) combined with oxygen, e.g., chromium(III) hydroxide, or their hydrates, can be employed as starting materials if desired. When a hydrated compound of chromium(III) and oxygen is employed for the preparation of chromium dioxide of high coercivity, the water of hydration should not exceed about 5% (by weight of the hydrated compound). If a starting material of greater hydration is to be used, the hydration must first be reduced, for example, by heating.

The conversion of these starting materials to ferromagnetic chromium dioxide is customarily carried out at temperatures above 250° C., since conversion to ferromagnetic chromium oxide at lower temperatures is very slow and usually incomplete. Although temperatures as high as 500° C. and above can be employed, such temperatures require the application of excesively high pressures and usually are to be avoided. Products of excellent magnetic properties are obtained when a maximum reaction temperature in the range of 300–450° C. is employed.

The pressures employed in the process of this invention usually range from about 50 atmospheres to 3000 atmospheres or more. Pressures of 50 to 800 atmospheres are preferred since these pressures can be obtained more economically than higher pressures.

Reaction time is not critical in the process of this invention. Reaction times ranging from 10 minutes or less to 15 hours or more at reaction temperature and pressure can be employed with satisfactory results.

In preparing ferromagnetic chromium dioxide according to the present invention, water in an amount ranging from about 5% to about 300% by weight of chromium(III) compound or thermal conversion product thereof is usually present. However, larger or smaller amounts can be employed if desired, and high-quality ferromagnetic chromium dioxide can be prepared by this process in the presence of as little as 1% water. Proportions of water greater than about 300% by weight of chromium compound as defined above can be employed but usually offer no advantage over smaller proportions with respect to product quality and reduce the volume efficiency of the pressure equipment employed. A quantity of water ranging from about 15% to about 200% based on the weight of the chromium(III) compound is often used.

Oxidizing conditions during the preparation of ferromagnetic chromium oxide according to the present invention are provided by inclusion of an oxidizing agent, e.g., hydrogen peroxide or chromium trioxide, in the reaction system or by pressuring the reactants with oxygen. The oxidizing agent should be present in quantity sufficient to convert the chromium(III) compound completely to ferromagnetic chromium dioxide, i.e., the oxidizing agent should provide at least one-half an atomic equivalent of oxygen for each atomic equivalent of Cr(III). Usually the oxidizing agent will be employed in an amount of 1.5–5 times this minimum requirement, although when gaseous oxygen is used much larger proportions of oxidizing agent are often employed. When hydrogen peroxide is employed, the water thereby introduced may serve wholly or in part as reaction medium.

If desired, modifying agents may be used in the process of this invention. Examples of modifying agents are found in U.S. Patents Nos. 2,885,365, 2,923,683, 2,923,684, 2,923,685, 3,034,988 and 3,068,176. These patents illustrate the use of antimony compounds, such as antimony trioxide and antimony halides, tin compounds, such as stannous sulfate, iron compounds, such as ferric oxide, alkali metal sulfates and ruthenium dioxide. However, an important advantage of the process of this invention is that it provides a method for preparing chromium dioxide of high coercivity without the use of a modifying agent. Modifying agents, when present, are employed in proportions as indicated in the aforementioned patents.

In the two-stage embodiment of this invention, the chromium(III) compound is first heated or calcined at substantially atmospheric pressure, i.e., at a pressure in the range of 0.5–5.0 atmospheres, to a temperature of 200°–1000° C. This heating is preferably carried out under oxidizing conditions, i.e., in the presence of air or oxygen to yield a thermal conversion product, which may in certain cases contain chromium with an average valence above 3, but less than 4. Periods of time ranging from a few minutes, e.g., 10 minutes, to several hours, e.g., 24 hours, are usually sufficient for this initial stage. In the second stage, the thermal conversion product is converted to ferromagnetic chromium oxide by oxidation at elevated pressure and temperature as described above.

The temperature conditions under which the first-stage heating is carried out depend upon the chromium (III) compound being heated and on the oxidizing agent, and on temperature and pressure conditions selected for the second stage of the process. When the second stage is carried out using $CrO_3$ as oxidizing agent under 500 atmospheres pressure at a maximum temperature of 350° C., heating in the first stage of chromium (III) compound prepared by precipitation from chromium nitrate or chloride is preferably carried out at a temperature in the range of 500–950° C. Products with a coercive force above 300 oersteds are obtained when the temperature in the first stage is in the range of 500-700° C. On the other hand, when chromium(III) compounds with less water of hydration are used or when the second stage is carried out at higher temperatures and pressures, for example, at 450° C. and 3000 atmospheres pressure, it may be necessary to employ temperatures in the range of 200–500° C. in the first stage.

The minimum quantity of oxidizing agent necessary in the second stage is less than that required in the single-stage process in proportion to the oxidation occurring during the first stage of the two-stage process. However, as explained above, a much larger proportion of oxidizing agent than this minimum requirement will usually be employed. When high temperatures have been employed in the first stage of the two-stage process, i.e., temperatures of 800–1,000° C., it is preferred that a large excess of oxidizing agent be employed in the second stage of the process. Under such conditions the coercivity of the final product will be found to increase as the pressure employed in the second stage is reduced.

The coercivity of the chromium dioxide produced by the process of this invention is related to the particle size of the thermal conversion product, small particle size leading to high coercivity chromium dioxide. Average particle size is conveniently measured by determining surface area. For best results, the thermal conversion product should have a surface area above 5 sq.m./g., preferably above 15 sq.m./g., and should be substantially free of agglomerates.

For preparing product of high coercivity, it is preferred that the two-stage process be employed and that heating of the chromium(III) compound in the initial stage be carried out at a temperature above about 500° C. The chromium(III) compound so heated can be prepared from chromium trichloride since small uniform particles of hydrous chromic oxide are readily prepared by precipitation from this salt. However, complete removal of chloride from the precipitate is difficult, and, to avoid corrosion problems associated with chloride, chromium nitrate is often used. A very satisfactory product can also be prepared by reduction of $CrO_3$ with alcohol. In the second stage of the process, chromium trioxide is used as oxidizing agent preferably in a ratio, by weight, of 2 parts of chromium trioxide to 1 part of the product from the first stage.

The product obtained by the preferred two-stage process of this invention is ferromagnetic chromium dioxide of high purity in the form of small crystals of cubic or acicular shape. As is known, minor variations in chromium/oxygen ratio can occur in this oxide without substantial loss of magnetic properties. The chromium content of the present products ranges from about 60% to about 62% for air-dried samples and may range up to 62.5% on a moisture-free basis. X-ray examination shows this product to consist entirely of a tetragonal crystal structure of the rutile type, i.e., of the same type as rutile $TiO_2$. The product possesses outstanding magnetic properties, including a saturation induction per gram or sigma, $\sigma s$, in the range of 80–100 gauss cm.$^3$/g., an intrinsic coercive force, $H_{ci}$, ranging from about 10 to over 500 oersteds. The remanence ratio, i.e., ratio of the remanent induction per gram, $\sigma_r$, to the saturation induction per gram, $\sigma_s$, ranges up to about 0.5 as measured on randomly oriented samples.

As indicated above, ferromagnetic chromium dioxide of high coercive force, free of modifying elements, can be prepared by the two-stage embodiment of the present process and constitutes a preferred product of the present invention. This preferred unmodified, high coercive force ferromagnetic chromium dioxide possesses an intrinsic coercive force above 200 oersteds, and is in the form of highly uniform, fine acicular particles ranging up to 1.5 microns in length. These particles are single crystals and are characterized by being single magnetic domains. They have a median axial ratio, i.e., a ratio of length to transverse dimension, ranging from 2:1 to 20:1 or more. The best products for recording member use have an average particle length less than 1.0 micron (maximum length less than 1.2 microns) and an average particle width less than 0.2 micron with an average axial ratio of at least 5:1, preferably at least 10:1 ranging up to 40:1 or more. In these products the distribution of particle lengths usually is such that the length of the longest particle is not more than about ten times the length of the smallest particle. This uniformity in size is very advantageous since it contributes to uniformity in magnetic properties and to homogeneity of dispersions used in preparation of magnetic recording members. Such products, when randomly oriented, have a remanence ratio of at least 0.35 and usually in the range of 0.40–0.50. The crystallite size as measured by X-ray line broadening is also very uniform and is usually in the range of 0.05–0.20 micron. These products are particularly suited for use in the preparation of magnetic recording members because of their uniform small particle size, high coercive force and high remanence ratio.

Particularly significant features of the high-coercivity chromium dioxide of this invention are illustrated by the excellent slope and linearity characteristics of the remanence curve obtained by plotting remanence $\sigma_r$ as a function of field strength H. In magnetic recording members, the slope of the remanence curve is related to sensitivity and has been reported to influence high-frequency response, while the length of the linear region of the curve determines, in part, the output obtainable for a given distortion. The quality features of steep slope and high linearity cannot be present in the finished recording member unless they be present in the magnetic component thereof.

The method of determining the linearity and slope of the remanence curve is illustrated in the accompanying drawing which represents the curve obtained for a typical high-coercivity chromium dioxide. Linearity is defined as the ratio expressed as a percentage of the intercept of the linear portion of the curve on the remanence axis to the corresponding intercept of the entire curve. In the drawing, the straight portion lies between points A and B, and point C indicates the maximum remanence of the product. Linearity is $$\frac{\sigma_r(B)-\sigma_r(A)}{\sigma_r(C)}\times 100$$

A linearity of 45 or above is desirable.

The slope of the $\sigma_r$ versus H curve is expressed as the ratio of the intercept on the remanence axis of the portion of the curve between points A and B to the intercept of the same portion of the curve on the field strength axis, i.e., the slope is $$\frac{\sigma_r(B)-\sigma_r(A)}{H(B)-H(A)}$$

the units being gauss cm.$^3$/g. oersted. The chromium dioxides of this invention preferred for use in recording members have a slope of the remanence curve of at least 0.07, preferably at least 0.08, gauss cm.$^3$/g. oersted.

The high-coercivity chromium dioxides of this invention exhibit two types of anisotropy. Crystalline anisotropy of chromium dioxide is directed at an angle of 30–40° to the *c* axis, while shape anisotropy of elongated particles lies along the *c* axis. The effect of shape anisotropy is to align the magnetization of the preferred single-domain, single-crystal particles parallel to the *c* axis, while crystalline anisotropy tends to align the magnetization at an angle of 30–40° to the *c* axis. Since the shape anisotropy field is approximately 15 times larger than the crystalline anisotropy field, the magnetization is aligned substantially parallel to the *c* axis, i.e., along the long axis of the particles. For this reason, the particles are readily aligned in substantiall parallel array in any desired direction in preparation of a magnetic recording member by application of a magnetic field in the direction of desired alignment before immobilization of the particles. This is an important feature since perfection of alignment in a recording member influences fidelity of response.

Products of low coercive force consist of larger particles e.g., up to 60 microns or more in size, and are composed of many magnetic domains. These products usually have a median axial ratio below about 3:1.

The sigma values employed herein are defined on pp. 5–8 of Bozorth's "Ferromagnetism," D. Van Nostrand Co., New York (1951). These sigma values are determined in fields of 4000–4400 oersteds on apparatus similar to that described by T. R. Bardell on pp. 226–228 of "Magnetic Materials in the Electrical Industry," Philosophical Library, New York (1955). The definition of intrinsic coercive force is given in Special Technical Publication No. 85 of the American Society for Testing Materials entitled "Symposium on Magnetic Testing" (1948), pp. 191–198. The values for the intrinsic coercive force given herein are determined on a DC ballistic-type apparatus which is a modified form of the apparatus described by Davis and Hartenheim in the Review of Scientific Instruments, 7, 147 (1936).

The process of this invention can be carried out in any equipment that is resistant to attack by the reactants and that provides the desired operating conditions. Suitable equipment is described, for example, in U.S. Patent 2,885,365.

The process of this invention is illustrated further by the following examples in which quantities of ingredients are expressed in parts by weight except as noted. Where a platinum tube is referred to, a flexible-walled tube is used, i.e., one having walls sufficiently thin to transmit external pressure to the tube contents.

EXAMPLE I (A) Hydrous chromic oxide or $Cr_2O_3$ hydrate was prepared by rapid addition of ammonium hydroxide (8.3% aqueous) to a strongly agitated, dilute (8%), aqueous solution of commercial chromic chloride hexahydrate $CrCl_3 \cdot 6H_2O$ until a pH in the range of 7–8.7 was attained. The precipitate formed was allowed to settle and the supernatant liquid was carefully siphoned off. The precipitate was washed several times by decantation with water and finally filtered, air-dried and pulverized. The hydrated chromic oxide so produced was a light-green powder, containing approximately 50% $H_2O$. The particles comprising this powder were less than 0.1 micron in size.

(B) Hydrous chromic oxide prepared as described above (10 g.) and frozen 30% hydrogen peroxide (11.2 g.) were hermetically sealed in a flexible-walled platinum tube. The tube was placed in a pressure vessel and subjected to a temperature of 360° C. and a pressure of 3000 atmospheres for a period of 48 hours. The product was high purity ferromagnetic chromium dioxide in the form of a highly crystalline, lustrous gray, magnetic powder consisting of multidomain particles 20–50 $\mu$ in length. After washing with water and air-drying, this powder exhibited an intrinsic coercive force, $H_{ci}$, of 13 oersteds and a sigma value, $\sigma_s$, of 91 gauss cm.$^3$/g.

(C) In another preparation, hydrous chromic oxide containing 30% water (prepared by reduction of $CrO_3$ with ethanol) was heated with an equal weight of 30% hydrogen peroxide at 360° C. under 3000 atmospheres pressure for 8 hours. The ferromagnetic chromium oxide produced was highly crystalline and had an intrinsic coercive force, $H_{ci}$, of 17 oersteds and a sigma value, $\sigma_s$, of 91 gauss cm.$^3$/g.

(D) In a further preparation, hydrous $Cr_2O_3$ was prepared as described in Part A above, except that chromic nitrate nonahydrate was employed in place of chromic chloride hexahydrate. After washing several times by decantation, the precipitate of hydrous chromic oxide was filtered and air-dried. The air-dry powder was heated in argon for 6 hours at 400° C. This dehydrated product was placed in an open platinum tube and subjected to an oxygen pressure of 3000 atmospheres at 400° C. for 8 hours. The ferromagnetic chromium dioxide produced by this treatment was a finely divided powder having an intrinsic coercive force, $H_{ci}$, of 135 oersteds, a sigma value, $\sigma_s$, of 83 gauss cm.$^3$/g. and a remanence ratio, $\sigma_r\sigma_s$, of 0.21.

(E) Hydrous chromic oxide prepared as described in Part D by air-drying the precipitate obtained from treatment of chromic nitrate nonahydrate with ammonium hydroxide was placed in a platinum tube with 123% (by weight based on the air-dry hydrous oxide) hydrogen peroxide of 30% concentration and the tube sealed. The tube and contents were heated to 360° C. under a pressure of 3000 atmospheres for 8 hours. The product was a highly crystalline ferromagnetic chromium dioxide having an intrinsic coercive force, $H_{ci}$, of 17 oersteds, a sigma value, $\sigma_s$, of 95 gauss cm.$^3$/g., and a remanence ratio ($\sigma_r/\sigma_s$) of 0.07. This product contained by analysis 61.7% chromium, and the average chromium valence was 3.99 [determined by oxidation with a known excess of ceric sulfate solution and back titration with standard sodium oxalate solution, cf. Willard and Young, J. Am. Chem. Soc. 50, 1322 (1928)]. Spectrographic analysis showed the presence of only trace amounts of platinum (50–250 p.p.m.), silicon (50–250 p.p.m.), magnesium (5–25 p.p.m.) and cooper (50–150 p.p.m.) as the sole impurities.

EXAMPLE II (A) Hydrous chromic oxide prepared as described in Example I-A by treatment of chromic chloride with ammonium hydroxide was placed in a platinum tube with 70% (by weight based on the hydrous chromic oxide) of chromium trioxide and 200% water. After sealing, the tube and its contents were heated at a temperature of 360° C. under a pressure of 3000 atmospheres for 8 hours. The product was highly crystalline ferromagnetic chromium dioxide having an intrinsic coercive force, $H_{ci}$, of 13 oersteds, a sigma value, $\sigma_s$, of 91 gauss cm.$^3$/g., and a remanence ratio, $\sigma_r/\sigma_s$, of 0.05. The crystals ranged in length up to about 60 microns. The product was obtained in essentially quantitative yield, both the chromium introduced as hydrous chromic oxide and that introduced as chromium trioxide being converted to ferromagnetic chromium dioxide.

(B) Hydrous chromic oxide prepared from chromic chloride was heated to 800° C. for 2 hours in air. The product together with 200% by weight chromium trioxide and 75% by weight water (percentages based on the weight of the heated hydrous chromic oxide) was heated in a sealed platinum tube at 350° C. under 1000 atm. pressure for 8 hours. The ferromagnetic chromium oxide so produced had an intrinsic coercive force, $H_{ct}$, of 373 oersteds, a sigma value, $\sigma_s$, of 85 gauss cm.$^3$/g. and a remanence ratio, $\sigma_r/\sigma_s$, of 0.45.

(C) The procedure described in paragraph B above was followed using hydrous chromic oxide prepared from chromic nitrate nonahydrate. The ferromagnetic chromium oxide produced had an intrinsic coercive force, $H_{ci}$, of 296 oersteds, a sigma value, $\sigma_s$, of 84 gauss cm.$^3$/g. and a remanence ratio, $\sigma_r/\sigma_s$, of 0.44.

(D) Hydrous chromic oxide prepared from chromic chloride was heated at 500° C. for 2 hours in air. The product was converted to ferromagnetic chromium oxide as described in paragraph B above. The magnetic oxide produced had an intrinsic coercive force, $H_{ci}$, of 445 oersteds, a sigma value, $\sigma_s$, of 82 gauss cm.$^3$/g., and a remanence ratio, $\sigma_r/\sigma_s$, of 0.46.

EXAMPLE III

The hydrous chromic oxide prepared as described in Example II-A was heated at atmospheric pressure in a stream of oxygen at 360° C. for 1 hour. The resultant brown-black, finely divided powder was sealed in a platinum tube with an equal weight of 30% hydrogen peroxide (frozen) and 0.5% of antimony trioxide, and heated to a temperature of 450° C. under a pressure of 3000 atmospheres for 1 hour. The product was a black, acicular, ferromagnetic chromium dioxide having an intrinsic coercive force, $H_{ci}$, of 260 oersteds, a sigma value, $\sigma_s$, of 81 gauss cm.$^3$/g. and a remanence ratio, $\sigma_r/\sigma_s$, of 0.37. The individual particles composing this powder ranged in length up to 0.7 micron. The average particle length was 0.5 micron and the average cross-sectional dimension less than 0.1 micron.

EXAMPLE IV

Hydrous chromic oxide which had been heated to 360° C. in oxygen, as described in Example III, was sealed in a platinum tube with 75% of chromium trioxide and 100% of water. The tube and contents were heated to 330° C. under a pressure of 200 atmospheres for 8 hours. The product was black, acicular, ferromagnetic chromium dioxide of excellent quality having an intrinsic coercive force of 345 oersteds, a sigma value, $\sigma_s$, of 80 gauss cm.$^3$/g. and a remanence ratio, $\sigma_r/\sigma_s$, of 0.45. This product was a very uniform fine powder composed of particles about 0.3 micron in average length and less than 0.1 micron in average cross-sectional dimension.

above was employed except that 0.5% of antimony tri-

In another preparation, a starting mixture as described oxide was added. The mixture was heated at 450° C. under 750 atmospheres pressure for 1 hour. The product was a black, acicular, ferromagnetic chromium dioxide having an intrinsic coercive force of 360 oersteds, a sigma value, $\sigma_s$, of 79 gauss cm.$^3$/g. and a remanence ratio, $\sigma_r/\sigma_s$, of 0.43. The particles of this product averaged less than 0.5 micron in length.

EXAMPLE V (A) Hydrous chromic oxide was heated at atmospheric pressure in air at 360° C. for 2 hours. The black powder produced was placed in a platinum tube together with 200% (by weight based on the black powder) of water and 225% of chromium trioxide. After sealing, the tube and contents were subjected to a temperature of 350° C. under a pressure of 750 atmospheres for 8 hours. The product was a high-quality ferromagnetic chromium dioxide having an intrinsic coercive force of 332 oersteds, a sigma value, $\sigma_s$, of 85 gauss cm.$^3$/g. and a remanence ratio, $\sigma_r/\sigma_s$, of 0.39. The individual particles of this product averaged less than 0.5 micron in length.

(B) Hydrous chromic oxide as described in Example I, Part E, was converted to a thermal conversion product by heating at 360° C. for 2 hours in air. This product was then converted to ferromagnetic chromium dioxide by heating for 8 hours at 360° C. under a pressure of 3000 atmospheres with equal weights of chromium trioxide and water. The product was a strongly magnetic black powder having a coercive force, $H_{ci}$, of 240 oersteds, a sigma value, $\sigma_s$, of 89 gauss cm.$^3$/g. and a remanence value, $\sigma_r/\sigma_s$, of 0.36. The particles ranged up to 1 micron in length. The product had a chromium content by analysis of 62.06%, and only trace amounts of other metals were found by spectrographic analysis, viz., platinum (50–250 p.p.m.), silicon (50–250 p.p.m.), magnesium (25–150 p.p.m.), and copper (50–150 p.p.m.).

EXAMPLES VI–IX

These examples illustrate the preparation of ferromagnetic chromium oxide from various types of chromic oxide. The preparations were carried out at 360° C. under 3000 atmospheres pressure for 8 hours, using chromium trioxide (117–125% by weight based on chromic oxide starting material) as oxidizing agent and water (117–125%) as medium. The types of chromic oxide employed and the properties of the ferromagnetic chromium oxide produced are summarized in Table I.

*Table I*

FERROMAGNETIC CHROMIUM OXIDE FROM CHROMIC OXIDE

| Example No. | Starting Material | Product | | | |
|---|---|---|---|---|---|
| | | $\sigma_s$ (gauss cm.$^3$/g.) | $H_{ci}$ (oersteds) | $\sigma_r/\sigma_s$ | Maximum Particle Length (microns) |
| VI | (1) | 87 | 232 | 0.38 | 1.0 |
| VII | (2) | 87 | 165 | 0.31 | 1.0 |
| VIII [3] | $Cr_2O_3$ [4] | 84 | 143 | 0.30 | 1.0 |
| IX | $Cr_2O_3$ [5] | 90 | 50 | 0.10 | 3.0 |

[1] Hydrous chromic oxide prepared as in Example I by treatment o aqueous chromic chloride with ammonium hydroxide and heated to 600° C. for 2 hours.

[2] Hydrous chromic oxide prepared as in Example I by treatment of aqueous chromic chloride with ammonium hydroxide and heated to 900–1,000° C. for 3 hours.

[3] $NaBrO_3$ (33%) added to charge.

[4] Analytical reagent.

[5] Commercial pigment—Guignet's green.

EXAMPLE X

A thermal conversion product of hydrous chromic oxide prepared as described in Example V–B by heating the hydrous oxide in air at 360° C. for 2 hours was converted to ferromagnetic chromium dioxide of high quality by heating for 8 hours at 360° C. under a pressure of 3000 atmospheres with equal weights of chromium trioxide and water. The product was a strongly magnetic, black powder having a coercive force, $H_{ci}$, of 270 oersteds, a sigma value, $\sigma_s$, of 84 gauss cm.$^3$/g. and a remanence ratio, $\sigma_r/\sigma_s$, of 0.40. The powder was composed of highly uniform acicular particles less than 1.5 microns in length having a ratio of length to transverse dimension (axial ratio) in the range of 3:1 to 20:1. This product was employed in the preparation of a magnetic recording member as described below.

The ferromagnetic chromium dioxide described above (6.58 g.) was demagnetized by exposure to a 60 cycle A.C. field and mixed with 100 g. of distilled γ-butyrolactone and 0.05 g. of dioctyl sodium sulfosuccinate. The mixture was milled for 2 hours in a centrifugal mill and the excess lactone decanted from the magnetic oxide leaving 31.2 g. of wet oxide. Microscopic examination of this product showed that the particles were less than 1 micron in length and that all large aggregates had been dispersed. The dispersion was next milled for 2 days using 40 g. of glass beads in a 4-oz. bottle, whereupon 2.21 g. of polyvinyl fluoride and an additional 5 g. of $\gamma$-butyrolactone were added, and milling continued for 4 hours longer. The dispersion was removed from the mill and sand-milled three times through a 450-mesh screen. The resultant dispersion contained 22.7% of total solids of which 75% was chromium oxide.

The dispersion was cast on a glass plate using a 7-mil doctor knife. To orient the magnetic particles in the dispersion, the cast dispersion was placed along the axis of a solenoid and exposed for a period of 65 seconds to a D.C. field of 2800 oersteds having superposed thereon an A.C. field of 825 oersteds. Concurrently with exposure to the field, the cast dispersion was coalesced by exposure for 65 sec. to heat from a heated glass panel ½" away (the temperature measured by a thermocouple ⅛" from the surface of the panel was 380° C.). The oriented, coalesced dispersion was taken from the solenoid, reinforced with polyester tape backing and slit to ¼" width. Several of the lengths thus obtained were spliced end-to-end to produce a recording member suitable for testing.

In testing this magnetic recording member, output was measured at a series of frequencies by one or both of two methods. Method A was a modification of the procedure given in Military Specification MIL–T–21029, using an Ampex No. 307 Tape Recorder, modified by replacing the equalized playback amplifier by a flat amplifier having a gain, uniform at all frequencies, of 40 decibels. The tape (¼" wide) was tested at a speed of 15 inches/sec. at maximum recording level under optimum bias conditions. Optimum bias is measured at a frequency of 5000 cycles/sec. and is the bias current for which output is largest for an input of +4db as read from a standard vu meter (for definition of vu, or volume unit, see "Elements of Sound Recording," Frayne and Wolfe, John Wiley & Sons, Inc., N.Y., 1949, page 212). Maximum recording level is defined as the level of a 1000 cycle/sec. input signal which produces a desired level (1% or 3%) of third-harmonic distortion in the output under optimum bias conditions. In an alternative method (Method B) for testing response, bias and input were determined at 1000 cycles by measuring the maximum input which could be employed without exceeding 3% third-harmonic distortion in the output at each of a number of bias values. The bias giving the largest output was employed for testing at other frequencies. Reproducibility of output measurements by either method is generally ±1 decibel. To minimize the quantity of tape required, the tape was tested in the form of a continuous loop 40" in length.

The response of this recording member is indicated in Table II.

*Table II*

| Frequency (kc./sec.) | Output (db) at 3% Distortion | |
|---|---|---|
| | Method A | Method B |
| 1 | −8.0 | −3.2 |
| 2 | −4.2 | 0.0 |
| 4 | −2.1 | +1.5 |
| 10 | −2.4 | −2.5 |
| 15 | −8.5 | −17.5 |
| Input (constant at all frequencies) | +11.2 | +20.4 |

EXAMPLE XI

Hydrous $Cr_2O_3$ was prepared by addition of ammonium hydroxide as described in Example I to aqueous chromic nitrate nonahydrate solution of 4% concentration until a pH of 7.0 was attained. The precipitate was washed, filtered and air-dried. The air-dried product, which contained by analysis approximately 50% moisture, was placed in an open platinum tube and subjected to 3000 atmospheres oxygen pressure at a temperature of 360° C. for 8 hours. The ferromagnetic chromium dioxide produced was in the form of cubes approximately 5–10 microns on an edge and exhibited an intrinsic coercive force, $H_{ci}$, of 30 oersteds, a sigma value, $\sigma_s$ of 96 gauss cm.³/g. and a remanence ratio, $\sigma_r/\sigma_s$, of 0.04.

EXAMPLE XII

Using the general procedure described in Example X magnetic recording members were prepared from ferromagnetic chromium oxides having characteristics shown in Table III. These chromium oxides were prepared by the two-stage process starting from chromium nitrate nonahydrate. The hydrous chromic oxide was heated at 600° C. for 2 hours in air during the first stage of the process. It was then mixed with equal weights of chromium trioxide and water and heated at 360° C. under 3,000 atm. pressure for 8 hours in a sealed platinum tube. The properties were as follows.

*Table III*

| Property | Product 1 | Product 2 |
|---|---|---|
| $H_{ci}$(oersteds) | 243 | 225 |
| $\sigma_s$(gauss cm.³/g.) | 86 | 85 |
| $\sigma_r/\sigma_s$ | 0.39 | 0.36 |

Each of these products was employed in the preparation of a magnetic recording member as follows: 6.6 g. of demagnetized ferromagnetic chromium oxide, 100 g. of distilled $\gamma$-butyrolactone, and 0.05 g. of dioctyl sodium sulfosuccinate were milled for 3 hrs. in a centrifugal mill. Excess lactone was then decanted from the magnetic oxide leaving approximately 32 g. of wet oxide. Approximately 9 g. of $\gamma$-butyrolactone was used in transferring the wet oxide to a 4-oz. jar containing 20 g. of ¼ in. glass beads. The jar was rolled for 43 hrs. whereupon 2.2 g. of polyvinylfluoride was added and rolling continued for 3 hours (Product 1) or for 1 hour (Product 2). The dispersion was separated from the glass beads and sand-milled through a 450 mesh screen (three times for Product 1; once for Product 2).

The dispersion containing Product 1 was cast on a glass plate using a 4-mil knife and the cast dispersion was oriented by passing once over a horseshoe magnet followed by exposure to an A.C. field of 320 oersteds. The cast dispersion was coalesced as described in Example X (exposure time, 65 sec.) and a backing film of commercial polyethylene terephthalate was attached to the coalesced dispersion using polyester adhesive.

The dispersion from product 2 was similarly cast using a 5-mil knife and the cast dispersion was oriented by exposure to a D.C. magnetic field of 2800 oersteds having superposed thereon an A.C. field of 720 oersteds. The cast dispersion was coalesced as described in Example X (exposure time, 75 sec.), A layer of cellulose acetate was cast over the coalesced dispersion to provide a backing. The final thickness of the cast dispersion plus backing after drying was 1.6 mils.

For testing, the coalesced dispersion supported by the backing was removed from the glass plate, and slit to a ¼-in. width. Several lengths thus obtained were spliced end-to-end to produce a recording member of desired length. The recording member from Product 1 contained 1.8 milligrams of ferromagnetic chromium oxide per linear inch of ¼-inch tape and that from Product 2, 2.2 milligrams per linear inch of tape. Testing was carried out according to Method B (see Example X). Results were as follows:

*Table IV*

| Frequency (kc./sec.) | Output (db)—Method B | |
|---|---|---|
| | Product 1 | Product 2 |
| 1 | +3.5 | +8.0 |
| 2 | +8.1 | +11.8 |
| 4 | +10.9 | +13.4 |
| 10 | +11.1 | +8.8 |
| 15 | +9.1 | −0.2 |
| Input (constant at all frequencies) | +12.3 | +24.3 |

*Example XIII*

This example illustrates the preparation of hydrous chromia for conversion to ferromagnetic chromium oxide according to a preferred embodiment of this invention.

A solution of 1.92 l. of commercial ammonium hydroxide (28–30% $NH_3$) in 4.08 l. of distilled water was rapidly added at room temperature with very vigorous agitation to a solution of 2.72 kg. of chomic nitrate nonahydrate [$Cr(NO_3)_3.9H_2O$] in 18.1 kg. of distilled water. The slurry of hydrous chromia so formed was diluted with 29.9 kg. of distilled water and allowed to stand overnight. The upper layer of clear liquid was then decanted leaving a concentrated slurry of hydrous chromia. A second preparation was made as just described, and the concentrated slurries were combined and pressure-filtered. The filter cake was washed three times with 21.8 kg. portions of distilled water, and dried for three days at room temperature in a current of air maintained at a dewpoint of −25° C. The dried cake was pulverized to a fine powder using an exit screen having 36-mil openings on the pulverizing equipment.

The powder so obtained was a pale blue-green hydrous chromia containing, by anlysis, 32.85% Cr, 0.16% $NH_3$ and 0.06% nitrate (as $NO_3$). Traces, i.e., 25 p.p.m. or less, of Fe, Mg, Si, Cu, Al, and Na were present as demonstrated by emission spectroscopy. The X-ray pattern corresponded to that reported by Schafer and Roy [Z. anorg. allg. Chem. 276, 275 (1954)] for $Cr(OH)_3$ with two, additional, very weak, unidentified lines. Analytical data for the present product showed that the material is more correctly formulated as $Cr(OH)_3.3H_2O$ or $Cr_2O_3.9H_2O$. The average chromium valence determined by analysis, 2.97, agreed with formulation of the product as a compound of trivalent chromium. The powder consisted of small, flake-like, angular particles having an average crystallite size, determined by X-ray line broadening, of 0.076 micron. The particles ranged in size from 0.02 to 0.17 micron (by electron microscopy) and had a surface area by the BET[1] method, after drying in vacuum at 125° C., of 58.3 sq. m./g. (based on weight after drying). Based on the weight before drying, this value was 36.2 sq. m./g.

This hydrous chromia was further treated as described in Example XIV.

EXAMPLE XIV

This example illustrates the preparation of thermal conversion products for use in formation of high-quality ferromagnetic chromium oxide according to preferred embodiments of this invention.

The hydrous chromia, prepared as described in Example XIII, was divided into three lots. Each lot was spread in trays in layers approximately one-half inch in depth and heated in a muffle furnace with the furnace door closed. After the heating, the material in each lot was allowed to cool and rolled for 2 hours in a round glass bottle approximately one-quarter full to insure uniformity. Heating conditions and characteristics of the thermal conversion products produced from each lot of hydrous chromia are shown in Table V.

*Table V*

TREATMENT AND CHARACTERISTICS OF THERMAL CONVERSION PRODUCTS

| | Lot 1 | Lot 2 | Lot 3 |
|---|---|---|---|
| HEATING CONDITIONS | | | |
| Time to reach temperature, temperature | 0.5 hr., 525° C. | 0.75 hr., 670° C. | 1.5 hrs., 920° C. |
| Time at temperature, temperature | 2 hrs., 525° C. | 2 hrs., 670° C. | 2 hrs., 920° C. |
| PRODUCT CHARACTERISTICS | | | |
| Analyses: | | | |
| Percent Cr | 67.0 | 68.1 | 68.3. |
| Percent N | None | None | None. |
| Cr valence | 2.98 | 3.03 | 3.08. |
| Trace metals (25 p.p.m. or less; by emission spectroscopy). | Fe, Mg, Si, Cu, Al, Na | Fe, Mg, Si, Cu, Al, Na | Fe, Mg, Si, Cu, Al, Na. |
| X-ray diffraction pattern | $Cr_2O_3$ | $Cr_2O_3$ | $Cr_2O_3$. |
| Surface area (BET method), sq. m./g. | 33.0 | 16.1 | 7.8. |
| Particle size (micron): | | | |
| Range (electron microscopy) | 0.02–0.1 | 0.03–0.23 | 0.08–0.6. |
| Average (from surface area assuming density of 5.21 g./cc.). | 0.035 | 0.072 | 0.148. |
| Crystallite size (by X-ray line broadening), micron | 0.027 | 0.098 | 0.300. |
| Particle appearance | Angular, some flat | Dense, angular, some flat | Quite dense, angular, some flat. |

These products were used in the preparation of three lots of chromium dioxide as described in Example XV.

EXAMPLE XV

Each of the three thermal conversion products prepared as described in Example XIV was mixed individually with chromium trioxide and distilled water in the proportions, by weight (thermal conversion product:$CrO_3$:$H_2O$), 225:450:169. The mixtures were placed in three flexible-walled, platinum tubes which were then welded shut, placed in larger pressure vessels and externally pressured with 200 atmospheres of argon. The pressure vessels containing the sealed tubes were heated as indicated in Table VI, below with consequent increase in argon pressure. Argon was released as necessary to maintain a pressure of 500 atmospheres.

*Table VI*

| Temperature: | Time, hrs. |
|---|---|
| To 245° C. | 1.25 |
| To 280° C. | 0.5 |
| To 315° C. | 0.5 |
| To 350° C. | 0.5 |
| At 350° C. | 8 |

The pressure vessels were then cooled, the pressure, released, and the platinum tubes removed. The contents of each tube was separately pulverized and suspended in one gallon of distilled water. The thick suspensions were stirred with three gallons of distilled water and allowed to settle overnight. The supernatant liquids were then decanted, and the solid products finally separated by suction filtration. Each product was washed on the filter eight times with two-gallon quantities of distilled water and twice with six-pound quantities of acetone. The products were removed from the filters and dried to constant weight at room temperature (3 days) in a vacuum of less than 0.1 mm. of Hg. All three products were high-quality ferromagnetic chromium oxide of rutile crystal structure in the form of small, acicular particles. Each product contained particles which appeared to be flat and transparent

[1] Brunauer-Emmett-Teller method—see Emmett, "Catalysis," Vol. I, "Fundamental Principles," Chapter 2, page 36, Reinhold Publishing Corporation, 1954.

from the jar, filtered through heavy filter cloth ("Canton" cloth) under a nitrogen pressure of about 10 p.s.i. Methyl phenyl silicone fluid having a nominal viscosity of 100–150 centistokes at 25° C. (0.25 g.), was added along with a small amount of additional methyl isobutyl ketone to bring the viscosity into the range of 7.8–8.2 poises as determined on a Brookfield Viscometer using a No. 4 spindle at 50 r.p.m. The final viscosity and the solids content of the resultant dispersion are indicated in Table VIII. Such dispersions were prepared from each of the chromium dioxides of Examples XV and XVI.

The dispersions were coated on one-mil, commercial, biaxially oriented polyethylene terephthalate film using a continuous coater. Coatings were laid down from a 50-line per inch gravure roll and smoothed by passage of the coated film over closely spaced (15 mil gap) north and south poles of an electromagnet having a maximum field strength perpendicular to the pole faces of 1400–2300 oersteds. The magnetic particles in the smoothed coating were oriented longitudinally on the film by passing the coated film between opposed permanent magnetic N and S poles generating a maximum field of 300–880 oersteds in the plane of the film. After orientation, solvent was removed by passing the coated film through a drying tunnel (front end, 38–40° C., contact time, 0.12 min.; back end, 55–90° C., contact time, 0.09 min.). The dried coating was calendered by a chrome-plated steel roll operating against a hard rubber roll under a pressure of 600–800 p.l.i. and at a temperature of 97–112° C. The calendered product was slit to ¼" widths and tested for performance as a magnetic recording member.

The tests were conducted using an Ampex F–44 audio recorder operated at 3.75 i.p.s. which had been standardized using an Ampex 31331–01 reproduce alignment tape. All decibel levels in the test are referred to the standard 0.5-kc. output levels on the alignment tape which was assigned the value 0 db. Frequency response was determined using a constant record head input current at all frequencies, the current used being that corresponding to the maximum output level for 3% total harmonic distortion at 0.5 kc. The output was taken directly from the head using as uncompensated reproduce amplifier. Typical results are shown in Example VIII.

Results obtained using a high-quality commercial instrumentation tape are also included in Table VIII for comparison. It will be noted that the chromium dioxide tapes were consistently superior by approximately 4–6 db. to the commercial tape in the 15-kc. output. An improvement of 6 db corresponds to a four-fold increase in sound intensity.

*Table VIII*

PREPARATION AND PROPERTIES OF $CrO_2$ RECORDING MEMBERS

| Example No. | Milling Time, Hrs. | Solids, Percent by Vol.[1] | Coating Thickness, mils | Output, Decibels | | |
|---|---|---|---|---|---|---|
| | | | | Saturation (at 0.5 kc./sec.) | Maximum for 3% Third Harmonic Distortion | |
| | | | | | 0.5 kc./sec. | 15 kc./sec. |
| XV (Lot 1) | 31 | 9.7 | 0.18 | +9.3 | 0 | 6.5 |
| XV (Lot 2) | 27 | 11.1 | 0.21 | +9.5 | +1.5 | [3] +6.0 |
| XV (Lot 3) | 31 | 9.7 | 0.21 | +9.0 | +0.5 | [3] +4.0 |
| XVI | [2] 44.5<br>62 | 8.7 | 0.20 | +10.5 | +2.8 | +6.5 |
| High quality commercial instrumentation tape | ---------- | ---------- | 0.32 | +13.5 | +5.5 | 0 |

[1] All dispersions had a viscosity of 7.8–8.2 poises.
[2] After 44.5 hours, 62 g. of methyl ethyl ketone was added and milling was continued to total of 62 hours.
[3] After calendering against polyethylene terephthalate photographic film base.

EXAMPLES XVIII–XXI

A number of additional experiments were run designed to show the use of the modifying materials iron, vanadium, antimony fluoride, and arsenic in the process of this invention as follows:

Thin-walled, flexible platinum tubes, 8 inches in length by ½ inch in diameter; were charged with the quantities of water and premixed solids specified in Table IX. The charge was stirred, and the tubes were welded shut. The sealed tubes were placed in pressure vessels which were pressured to somewhat less than the final specified pressures. Temperatures and pressures were then raised to the specified levels over a 2 hour period and maintained there for 8 hours. The tubes were allowed to cool under pressure, removed from the pressure vessel, opened, and the black reaction products were washed with water, crushed in a mortar, and reslurried repeatedly in water until the wash water remained colorless. The washed products were collected on a filter and dried by evacuation over $P_2O_5$ at 25° C. Characterization data are shown in Table IX.

*Table IX*

FERROMAGNETIC CHROMIUM OXIDE MODIFIED WITH VARIOUS MATERIALS

| Example No. | Reaction Mixture[1] | | Reaction Conditions | | Magnetic Properties of Product[2] | | | | Maximum Size[3] of Most Particles (μ) |
|---|---|---|---|---|---|---|---|---|---|
| | Modifier (grams) | Water (ml.) | Temperature (° C.) | Pressure (Atm.) | Curie Temp. (° C.) | Coercivity (oersteds) | Sigma Value (4,400 Oe. field) | Remanence Ratio $\sigma_r/\sigma_s$ | |
| XVIII-A[4] | $Fe_2O_3$ (0.107) | 1.53 | 425 | 3,000 | 130 | 180 | 84.1 | 0.33 | 1.5x0.1 |
| XVIII-B[4] | $Fe_2O_3$ (0.272) | 1.57 | 425 | 3,000 | 131 | 226 | 81.4 | 0.40 | 2.5x0.1 |
| XIX-A | $V_2O_5$ (0.246) | 1.56 | 350 | 500 | 113 | 206 | 61.8 | 0.41 | 1.25x0.15 |
| XIX-B | $V_2O_5$ (0.635) | 1.66 | 350 | 500 | 90 | 134 | 37.8 | 0.27 | 0.5x0.1 |
| XX | $SbF_3$ (0.119) | 1.53 | 400 | 1,000 | 109 | 228 | 74.0 | 0.38 | 0.5x0.08 |
| XXI | $As_2O_5$ (0.457) | 1.61 | 400 | 1,000 | 103 | 172 | 50.5 | 0.30 | 0.6x0.08 |

[1] In all cases the mixture included 4.0 g. $CrO^3$ and 2.0 g. Cr(III) oxide, the latter being obtained by calcining freshly precipitated hydrous chromia (see Example XIII) at the following maximum temperatures (see Example XIV): XVIII–A and B, 630° C.; XIX–A, 920° C.; XIX–B, 525° C.; XX and XXI, 535° C.

[2] All products showed, by X-ray analysis, only lines characteristic of $CrO_2$.

[3] By electron microscopy; the particles were acicular in shape.

[4] The product of Example XVIII–A contained, by analysis, 1.24% Fe; that of Example XVIII–B, 3.07% Fe.

by electron microscopy. The characteristics of the products are summarized in the following table:

*Table VII*

CHARACTERISTICS OF FERROMAGNETIC CHROMIUM OXIDES

| Characteristic | Lot 1 | Lot 2 | Lot 3 |
|---|---|---|---|
| Analyses: | | | |
| Percent Cr | 61.38 | 61.69 | 61.63. |
| Percent N | None | None | None. |
| Percent $H^2O$ | 1.32 | 0.81 | 0.71. |
| Trace metals (25 p.p.m. or less; by emission spectroscopy. | Fe, Mg, Si, Cu, Al, Ag, Mo [1] | Fe, Mg, Si, Cu, Al, Ag | Fe, Mg, Si, Cu, Al, Ag. |
| X-ray cell constants: | | | |
| $a_o$ | 4.421±0.002 | 4.421±0.002 | 4.421±0.002. |
| $c_o$ | 2.917±0.002 | 2.917±0.002 | 2.917±0.002. |
| Surface area (BET method), sq. m./g | 23.0 | 14.7 | 12.1. |
| Particle size (micron): | | | |
| From surface area assuming density of 4.92 g./cc | 0.053 | 0.083 | 0.102. |
| By electron microscopy: | | | |
| Length | 0.08–0.8 | 0.1–1.2 | 0.12–1.2. |
| Width | 0.03–0.09 | 0.03–0.12 | 0.03–0.2. |
| Average (length and width) | 0.5 x 0.04 | 0.7 x 0.06 | 0.7 x 0.08. |
| Crystallite size by X-ray line broadening: | | | |
| From 110 plane, microns | 0.0514 | 0.097 | 0.103. |
| From 211 plane, microns | 0.0712 | 0.1286 | 0.1636. |
| From 101 plane, microns | 0.1120 | 0.2100 | 0.19–0.24. |
| Magnetic properties: | | | |
| Intrinsic coercive force, $H_{ci}$, oersteds | 420 | 309 | 264. |
| Sigma value, $\sigma_s$, 4,400 oersted field, gauss cm.$^3$/g. | 79.4 | 80.6 | 82.3. |
| Sigma value, $\sigma_r$, calculated for infinite field, gauss cm.$^3$/g. | 93.6 | 97.7 | 96.5 |
| Remanent induction, $\sigma_r$, gauss cm.$^3$/g. | 37.2 | 35.8 | 35.0. |
| Remanence ratio, $\sigma_r/\sigma_s$ | 0.47 | 0.45 | 0.43. |
| Linearity of remanence curve | 46 | 52 | 54. |
| Slope of remanence curve | 0.080 | 0.089 | 0.10. |
| Curie temperature,[1] ° C | 116 | 116 | 116. |

[1] 10–50 p.p.m.

[2] From magnetization as a function of temperature after magnetization of the sample in a field of 4,400 gauss and removal from the field.

All three products were examined by bright-field and dark-field electron microscopy, and selected single particles from each by electron diffraction. All particles appeared to be single crystals, although some contained defects. The particles were also examined using a defocused objective lens (Lorentz microscopy) and no domain walls were detected. The particles of all three lots are thus single-domain, single-crystal particles of high-purity ferromagnetic chromium oxide.

EXAMPLE XVI

This example illustrates the preparation of high-quality ferromagnetic chromium oxide in an unsealed container constructed of a corrosion-resistant material such as platinum, tantalum, gold, silica, or titanium which is placed within a larger pressure vessel.

A titanium reaction vessel was prepared from 1.5 inch, schedule 40, titanium pipe (American Society for Testing Materials, Specification B337–58T, Grade 2), 8.5 inches in length, by welding a 32-mil titanium sheet to one end. The outer wall of the vessel was machined to 1.800 inch diameter to fit inside a pressure vessel with approximately 1/32 inch clearance. A tantalum cover was prepared for the reaction vessel. The pressure vessel was constructed of stainless steel and had a stainless steel thermocouple well extending four inches down from the top through an opening in the reaction vessel cover. To prevent contact of the reaction mixture with the stainless steel, a tantalum sheet was closely wrapped around this well.

A solution of 90 g. of chromium trioxide in 63 ml. of water was prepared, and a mixture of 90 g. of thermal conversion product having a surface area of 20.6 sq. m./g. with 90 g. of chromium trioxide was also prepared. The thermal conversion product was produced from hydrous chromia (see Example XIII) by calcining at 600° C. (0.6 hour to reach 600° C., 3.5 hours at 600° C.—see Example XIV). The solution of chromium trioxide and the powder mixture were placed in the titanium reaction vessel and stirred for several minutes until a smooth paste was obtained. To minimize loss of water from the reaction mixture during heating, 10 ml. of water were poured into the pressure vessel. The reaction vessel was covered and placed in the pressure vessel, and the pressure vessel was closed.

The pressure vessel and contents were heated for 3.5 hours. During heating, the temperature of the reaction mixture, measured by a thermocouple in the well referred to above, rose from room temperature to 250° C. during the first 92 minutes, from 250 to 300° C. during the next 55 minutes, and from 300 to 339° C. during the next 64 minutes. At the end of the heating period, the temperature was 339° C. and the pressure was 320 atmospheres. The pressure above the reaction mixture corresponded to saturated steam pressure at the measured temperature until a temperature of 250° C. was reached. The difference between the reaction pressure and the pressure of saturated steam then increased continuously until a temperature of 330° C. was reached (elapsed time 3.25 hours). Above 330° C. the difference in pressure became constant, indicating that formation of chromium dioxide was complete. At the end of the heating period, the pressure vessel was allowed to cool overnight, the pressure was released, and the titanium reaction vessel removed. The reaction vessel contained a black magnetic solid which was removed, slurried with water, filtered, washed and dried. Conversion to $CrO_2$ was 99% of theoretical. Magnetic properties of the product were as follows:

| | |
|---|---|
| Intrinsic coercive force, $H_{ci}$ | 429 oersteds |
| Sigma value, $\sigma_s$ (4400 oersted field) | 81.5 gauss cm.$^3$/g. |
| Remanence ratio, $\sigma_r/\sigma_s$ | 0.49 |

The product was highly uniform, as indicated by the fact that samples taken along the length of the reaction vessel exhibited a maximum difference in coercivity of only 20 oersteds.

EXAMPLE XVII

This example illustrates the preparation and evaluation of superior recording members utilizing chromium dioxide prepared as described in Examples XV and XVI.

A mixture containing 127 g. of chromium dioxide, 50.7 g. of vinylidene chloride/acrylonitrile copolymer, 348 g. of methyl isobutyl ketone and 4.4 g. of dioctyl sodium sulfosuccinate was placed in a ceramic jar of 0.4-gallon capacity containing 650 ml. of 0.5″ diameter high-density porcelain balls. The jar was closed, and the mixture was milled for a period of time as indicated in Table VIII to mix the ingredients and disperse the chromium dioxide. At completion of the milling, the dispersion was removed

EXAMPLE XXII

For comparison with recording members containing the unmodified high-coercive force product of the present invention, a recording member was prepared from ferromagnetic chromium oxide made according to the method of U.S. Patent 2,956,955. Recording member performance was further compared with that of a standard commercial instrumentation tape containing iron oxide.

For preparing the oxide of U.S. 2,956,955, the procedure of Example III of the patent was followed using 78.8 g. of $CrO_3$ and 33 cc. of water as initial materials. The product was high-quality, ferromagnetic chromium oxide having a coercive force $H_{ci}$ of 63 oersteds. This oxide was employed in preparation of a recording member as follows:

An 8-oz., wide mouth, screw-cap jar was charged with 10 g. of the above ferromagnetic chromium oxide, 0.3 g. of cetyl dimethylamine, 17.5 cc. of toluene, and 17.5 cc. of t-butyl alcohol. The jaw was closed and rolled at 175 r.p.m. for four days. At the end of this time, 16.6 g. of a 20% solution of polyvinyl butyral in toluene:t-butyl alcohol (1:1 by weight) and 0.5 g. of dibutyl sebacate were added and milling resumed for four additional hours. The resultant fluid dispersion was filtered through closely woven cotton cloth.

The filtered dispersion was used to coat an ethylene glycol-terephthalic acid polyester film. A strip of film 3" wide and about 20" long was stretched flat on a smooth, firm support and wiped free of dust with a soft cloth. The filtered dispersion of ferromagnetic chromium oxide was coated on the film using a 6-mil doctor knife. The chromium oxide in the coating was aligned by passing the coated film between opposed N poles (½" separation; 620 oersted field) of two bar magnets and then along the axis of a solenoid (N pole adjacent N poles of the bar magnets) having a field strength of 640 oersteds. After alignment, the coating was dried in air by exposure to radiant heat. The dry coating was 0.6 mil in thickness and had a smooth surface. The coated film was slit to strips ¼" in width, and several such strips were spliced end-to-end as previously described for testing. The recording member so produced contained approximately 4.9 mg. of ferromagnetic chromium oxide per linear inch of ¼" tape.

Testing was carried out according to Method A (see Example X) with input being adjusted to produce 1% third-harmonic distortion in the output. Results are shown in Table X. For comparison, results obtained on testing a standard commercial instrumentation tape by Method A at input levels producing 1% and 3% third-harmonic distortion, respectively, are included in Table X.

*Table X*

RECORDING MEMBER TESTS

| Frequency (kc./sec.) | Output (db) by Method A | | |
|---|---|---|---|
| | Chromium Oxide (U.S. 2,956,955) Tape, 1% Distortion | Instrumentation Tape | |
| | | 1% Distortion | 3% Distortion |
| 1 | −25.5 | −19.0 | −12.8 |
| 2 | −20.5 | −14.6 | −8.8 |
| 4 | −17.9 | −12.2 | −6.5 |
| 10 | −19.5 | −12.5 | −6.8 |
| 15 | −23.6 | −18.1 | −11.8 |
| Input (constant at all frequencies) | +11.2 | 0 | +6.4 |

The present invention provides a reliable method for obtaining crystalline ferromagnetic chromium dioxide of high purity from trivalent chromium compounds. It also makes available for the first time unmodified ferromagnetic chromium dioxide of high coercive force which is particularly useful in the preparation of magnetic recording members.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. Process for the preparation of ferromagnetic chromium dioxide which comprises heating, at a temperature in the range 250–500° C., at a pressure of about 50–3000 atmospheres, and in the presence of about 1–300% by weight of water based on the weight of compound heated, a compound of chromium(III) combined with oxygen with an oxidizing agent, said compound of chromium (III) being selected from the group consisting of chromium oxide and hydrated forms thereof and chromium hydroxide and hydrated forms thereof.

2. Process for the preparation of ferromagnetic chromium dioxide according to claim 1 wherein at least 5% by weight of water is used and wherein the oxidizing agent is selected from the group consisting of chromium trioxide, hydrogen peroxide and oxygen.

3. Process for the preparation of ferromagnetic chromium dioxide which comprises heating, at a temperature in the range 200°–1000° C. and at a pressure in the range 0.5–5.0 atmospheres, a compound of chromium(III) combined with oxygen in the presence of oxygen, said compound of chromium(III) being selected from the group consisting of chromium oxide and hydrated forms thereof and chromium hydroxide and hydrated forms thereof, yielding a thermal conversion product having an average chromium valence above 3 and below 4, and heating said thermal conversion product in contact with an oxidizing agent at a temperature in the range 250°–500° C., at a pressure of about 50–3000 atmospheres, and in the presence of about 1–300% by weight of water based on the weight of thermal conversion product heated.

4. Process for the preparation of ferromagnetic chromium dioxide according to claim 3 wherein at least 5% by weight of water is used with said thermal conversion product and wherein the oxidizing agent is selected from the group consisting of chromium trioxide, hydrogen peroxide and oxygen.

5. Process for the preparation of ferromagnetic chromium dioxide according to claim 4 wherein water and said thermal conversion product are heated in contact with a modifying agent selected from the group consisting of antimony trioxide, antimony halides, stannous sulfate, alkali metal sulfates, ruthenium dioxide and ferric oxide.

6. Process for the preparation of ferromagnetic chromium dioxide which comprises heating, at a temperature in the range 200°–1000° C. and at a pressure in the range 0.5–5.0 atmospheres, hydrous chromic oxide in the presence of oxygen, yielding a thermal conversion product having an average chromium valence above 3 and below 4, and heating said thermal conversion product in contact with water, in an amount of 5 to 300% by weight of said product, and chromium trioxide at a temperature in the range 250°–500° C. and at a pressure in the range of 50 to 3000 atmospheres, whereby ferromagnetic chromium dioxide of coercive force of at least 200 oersteds is obtained.

7. Process for the preparation of ferromagnetic chromium dioxide which comprises heating, at a temperature in the range 200°–1000° C. and at a pressure in the range 0.5–5.0 atmospheres, hydrous chromic oxide in the presence of oxygen, yielding a thermal conversion product having an average chromium valence above 3 and below 4, and heating said thermal conversion product in contact with water, in an amount of 5 to 300% by weight of said poduct, and hydrogen peroxide at a temperature in the range 250°–500° C. and at a pressure in the range of 50 to 3000 atmospheres, whereby ferromagnetic chromium dioxide of coercive force of at least 200 oersteds is obtained.

8. Process for the preparation of ferromagnetic chromium dioxide which comprises heating, at a temperature in the range 200°–1000° C. and at a pressure in the range 0.5–5.0 atmospheres, hydrous chromic oxide in the presence of oxygen, yielding a thermal conversion product having an average chromium valence above 3 and below 4, and heating said thermal conversion product in contact with water, in an amount of 5 to 300% by weight of said product, and oxygen at a temperature in the range 250°–500° C. and at a pressure in the range of 50 to 3000 atmospheres, whereby ferromagnetic chromium dioxide of coercive force of at least 200 oersteds is obtained.

9. Process for the preparation of ferromagnetic chromium dioxide which comprises heating, at a temperature in the range 200°–1000° C. and at a pressure in the range 0.5–5.0 atmospheres, hydrous chromic oxide in the presence of oxygen, yielding a thermal conversion product having an average chromium valence above 3 and below 4, and heating said thermal conversion product in contact with antimony trioxide, water, in an amount of 5 to 300% by weight of said product, and chromium trioxide at a temperature in the range 250°–500° C. and at a pressure in the range of 50 to 3000 atmospheres, whereby ferromagnetic chromium dioxide of coercive force of at least 200 oersteds is obtained.

10. A ferromagnetic chromium dioxide free of modifying materials and having an intrinsic coercive force above 200 oersteds, a saturation induction per gram in the range of 80–100 gauss-cm.$^3$/g. and a remanence ratio of at least 0.35, said ferromagnetic chromium dioxide being in the form of highly uniform, fine, acicular particles of a tetragonal crystal structure of the rutile type ranging up to 1.5 microns in length, and having a median axial ratio ranging from 2:1 to 20:1, essentially all of which constitute single magnetic domains.

References Cited by the Examiner

UNITED STATES PATENTS

| | | | |
|---|---|---|---|
| 2,783,134 | 2/1957 | Hughes et al. | 23—145 X |
| 2,885,365 | 5/1959 | Oppegard. | |
| 2,923,683 | 2/1960 | Ingraham et al. | |
| 2,956,955 | 10/1960 | Arthur. | |

FOREIGN PATENTS

| | | |
|---|---|---|
| 15,694 | 5/1929 | Australia. |

OTHER REFERENCES

Darnell: "Magnetization Process in Small Particles of $CrO_2$," J. App. Physics, 32, No. 7, pp. 1269–1274, July 1961.

References Cited by the Applicant

UNITED STATES PATENTS

| | | |
|---|---|---|
| 3,080,319 | 3/1963 | Arrington. |

FOREIGN PATENTS

| | | |
|---|---|---|
| 1,154,191 | 10/1957 | France. |

OTHER REFERENCES

Guillaud et al.: Compt. Rend., vol. 219, pp. 58–60, July 10, 1944.

Jacobson: Encyclopedia of Chemical Reactions, vol. II, Chromium, Reinhold Publishing Corp., New York, N.Y., 1948, pp. 759, 780, 794.

Laubengayer et al.: J. Am. Chem. Soc. 74, 2362, 2363, May 5, 1952.

Gittleman: "Magnetic Properties of Recording-Tape Pigments," J. Audio Engineering Society 3, 186 (1955).

OSCAR R. VERTIZ, *Primary Examiner.*

BENJAMIN HENKIN, B. LEVENSON, *Assistant Examiners.*